United States Patent Office 3,263,737
Patented August 2, 1966

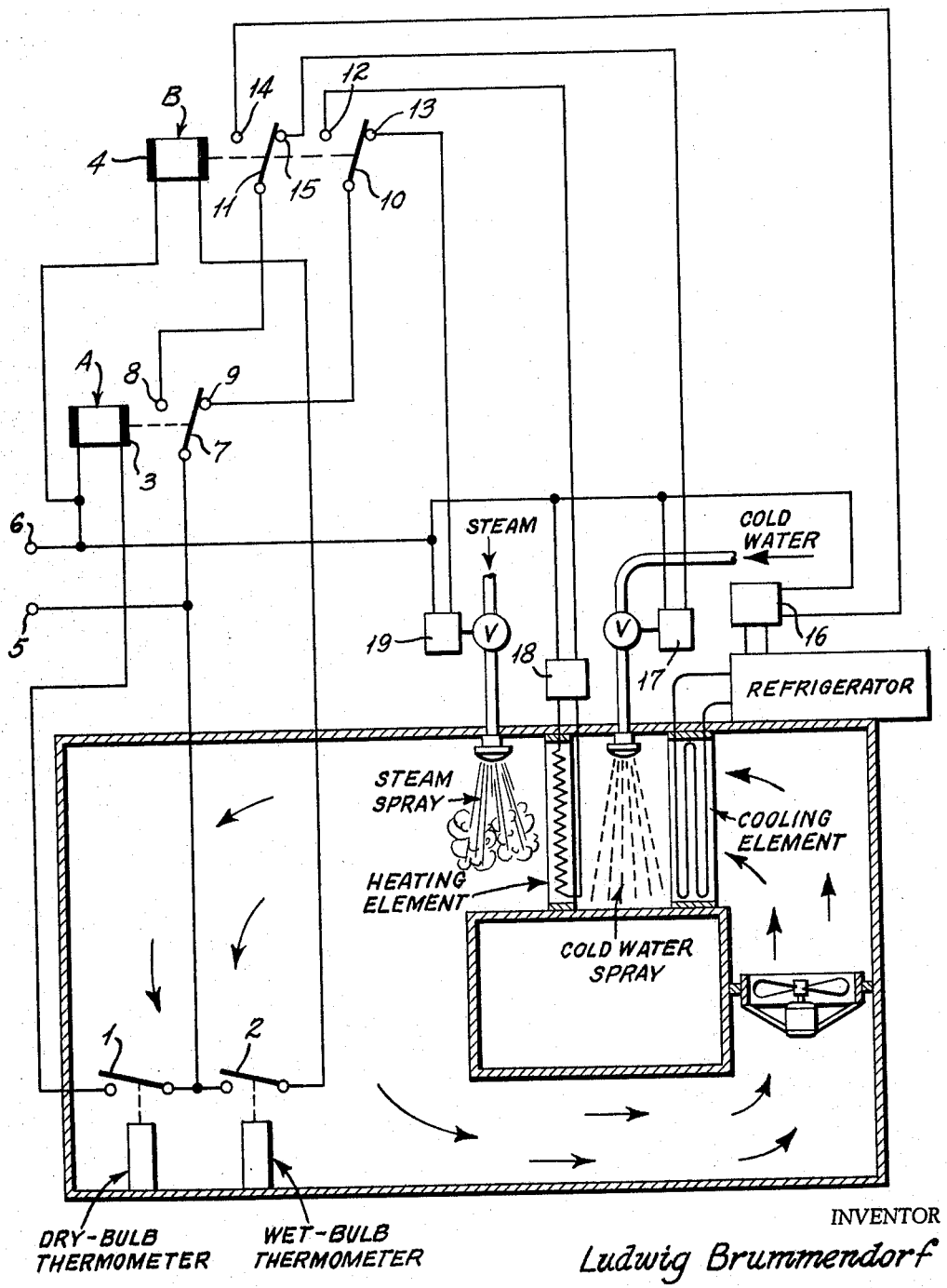

3,263,737
METHOD OF AUTOMATICALLY MAINTAINING THE CONDITION OF THE ATMOSPHERE WITHIN A ROOM
Ludwig Brümmendorf, Waxweiler, Eifel, Germany
Filed Nov. 29, 1963, Ser. No. 327,033
1 Claim. (Cl. 165—2)

The invention relates to a method of automatically maintaining the condition of the atmosphere within a room.

An air conditioning plant is known in which fresh air is mixed with recirculated air, the fresh air and recirculated air each being led through a separate cooling and humidifying plant, and being reheated after they are mixed, in a heating plant common to both. To this end, the heating plant, the cooling plant for the recirculated air, and the machine supplying the coolant for the cooling plant, are controlled by means of a single temperature measuring instrument. This air conditioning plant thus has the conventional type of dewpoint regulation, and the whole fresh air added as well as the whole of the recirculated air must be continually cooled below dewpoint and subsequently reheated. The power requirements of a plant of this nature are correspondingly high. Although this known plant operates somewhat more rapidly than other systems in which a heating unit is controlled by means of a thermometer and a humidifier by means of a hygrostat, this advantage is obtained at the expense of having to provide two separate cooling systems and two separate humidifying systems in addition to the heating system which is necessary in any case.

Another known system by means of which a definite state of humidity and a definite temperature are to be maintained within a room by treatment of a flow recirculated air, comprises a cooling plant controlled by a hygrostat and a heating device controlled by a thermostat and connected to the former downstream of the same in the direction of the flow of recirculated air. This system cannot produce the desired result, namely the maintenance of definite conditions in the atmosphere of a room. If the prevailing room temperature is higher than the normal setting and the prevailing atmospheric moisture lies below the nominal setting, the cooling device is turned off by the hygostat since dehumidification of the recirculating air is not permissible. The flow of recirculating air is not then cooled, so that neither the desired rated temperature, nor the desired atmospheric moisture or hygrometric condition, can be established. Another embodiment of this system is no different, in which the cooling device is mounted in an auxiliary duct by-passing the recirculated air duct, and is controlled by means of a thermostat instead of a hygrostat. By contrast, the hygostat which is also present, controls a flap which determines the proportion of the recirculated air flowing through the auxiliary duct and thus through the cooling device, that is to say the proportion of the overall volume.

Assuming the conditions referred to above to exist, the one thermostat switches on the cooling device, since the actual value of the temperature lies above the nominal value. The hygostat however sets the flap in such manner that the whole of the air flows through the main duct, by-passing the cooling device, since dehumidification may not occur owing to the hygrometric condition being of lesser degree than the rated value, this cooling device however being specifically intended for dehumidification by supercooling. Although the cooling device is turned on, it is not traversed by any air. The two control instruments, namely the one thermostat and the hygrostat, work against each other, and neither the desired temperature nor the desired hygrometric condition can be maintained in the room.

It is a main object of the present invention to provide improved automatic control of atmospheric conditions in a room, which avoids the disadvantages of the known systems.

Beginning from a system for the automatic maintenance of the condition of an atmosphere within a room involving the application of a cooling plant, a heating plant and a humidifying plant for a flow of recirculated air, the invention resides in that the flow of recirculated air is controlled automatically with the aid of a dry-bulb thermometer and of a wet-bulb thermometer as a function of the psychrometric difference, in such manner that in the case of excessive coldness and excessive dryness at which dry and wet thermostats switch on a humidification is performed which simultaneously supplies heat, that in the case of adequate warmth and excessive dryness at which the wet thermostat only switches on a humidification is performed which at the same time performs a cooling action, that in the case of adequate warmth and excessive humidity for which neither of the thermostats operate a cooling action is performed which at the same time has a drying effect, and that in the case of excessive coldness and excessive humidity for which the dry thermostat only switches on, a simultaneously drying heating action is obtained.

In the method according to the invention the recirculated air is thus either cooled and dried at the same time, or humidified and cooled at the same time, or heated and dried at the same time, or humidified and heated at the same time, these operations being continuous or performed at certain intervals. The actual values of the temperature and hygrometric condition thus fluctuate constantly about the nominal values within close limits. In the method of the invention, it is thus no longer necessary initially to cool the recirculated air below dewpoint in any event before heating it again to the nominal temperature. On the contrary, the cooling device, the heating device and the humidifying devices are always turned on only if this is absolutely necessary.

In order that the invention may be more clearly understood, an embodiment thereof will now be described, by way of example, with reference to the accompanying drawing which shows diagrammatically a system for the application of the method of the invention.

A room to be conditioned contains a switch 1 controlled by a dry-bulb thermometer 1 and a switch 2 controlled by a wet-bulb thermometer. A duct for recirculated air encloses in sequence, a cooling element fed with cold water or a coolant from a refrigerating machine and controlled by a coil 16, a cold water spraying device controlled by a coil 17, a heating element of optional nature, e.g. electrical, and controlled by a coil 18, and a steam spraying device controlled by a coil 19. The coils 16, 17, 18 and 19 represent diagrammatically the control circuits for the cooling element, the spraying device, the heating element and the steam spraying device.

The coil 3 of a single-pole tumbler switching relay A is connected to the dry-bulb thermometer switch 1, and the coils 4, 4 of a two-pole switching relay B are connected to the wet-bulb thermometer switch 2. The junction of the switches 1 and 2 is connected to one terminal 5 of an electrical potential source, and the upper ends of the coils 3 and 4 are connected in common to the other terminal 6 of the source. The operation of the circuit is such that one of the four control circuits 16 to 19 is always switched on.

If it is too cold and too dry in the room, control circuit 19 is energized so that the steam spraying device is switched on. If it is too warm and too dry in the room, the control circuit 17 is energized so that the cold water spraying device is switched on. If it is too warm and too damp in the room, the control circuit 16 is energized so that the coling element is switched on. If it is too cold and too damp in the room, the control circuit 18 is energized so that the heating element 18 is switched on.

If a temperature of +25° C. is to be maintained in a room at 80% to 83% relative humidity for example, the dry-bulb thermometer is so adjusted that the switch 1 switches on at 24.8° C. and switches off at 25° C. It is then apparent from the known psychrometric table (see Recknagel-Sprenger, "Taschenbuch fur Heizung und Lüftung," page 141) that the wet-bulb thermometer must be so adjusted that the switch 2 switches on at 22.8° C. and switches off at 23° C.

The dry-bulb thermometer switch 1 controls the operation of the single-pole switching relay A, and the wet-bulb thermometer switch 2 the operation of the double-pole switching relay B. The terminal 5 is connected to a contact terminal 7 of the relay A in such manner, that when the magnetic coil 3 is energized, current flows through contacts 7 and 8 to the contact 11 of the relay B. Depending on the setting of the thermometer switch 2 and thus energization or de-energization of the magnetic coils 4, the current then travels further to the contact 14 or 15 and from there through the control circuit 16 or 17 back to the other terminal 6 of the source of electrical potential.

If the magnetic coil 3 of the relay 3 is not energized, i.e. the switch 1 of the dry-bulb thermometer 1 is open the terminal 5 is connected to contact 10 through contacts 7 and 9, and depending on the setting of the wet-bulb thermometer switch 2, the current flows on to the contact 12 or 13 and from there through the control circuit 18 or 19 back to the terminal 6.

It is evident therefore that neither the dry-bulb thermometer alone nor the wet-bulb thermometer alone, can effect a switching action. Only both thermometers in conjunction can cause current to flow to one of the four control circuits, i.e. independently of the individual temperatures of the dry-bulb thermometer and of the wet-bulb thermometer, that is to say as a function of the psychrometric difference.

In other words, readings are no longer taken from the dry-bulb and wet-bulb thermometers as in known installations in order to determine relative humidity from a table, but both thermometers are equipped with an electrical contact at a point corresponding to a definite climate desired, and then switch accurately and independently according to the table reproduced below:

| Dry Temperature | Wet Temperature | Correction in the form of— |
|---|---|---|
| Too high current path 7-8-11. | Too high further current path 14-16. | Dry cold (16). |
| Too low current path 7-9-10. | Too high further current path 12-18. | Dry heat (18). |
| Too low current path 7-9-10. | Too low further current path 13-19. | Damp heat (19). |
| Too high current path 7-8-11. | Too low further current path 15-17. | Damp cold (17). |

The two thermometer contacts thus can only perform a switching operation together, and according to the level of the one and of the other, one of the four corrections is applied, which correction is just that required to re-establish the nominal atmospheric condition.

A further advantage of the novel climatic control system according to the invention lies in that the system may be employed reliably in conditions in which hygrostats comprising hygroscopically acting sensors fail, e.g. if the air is mixed with sawdust smoke, as in so-called smoking plants for example for smoking uncooked sausage or similar meats, or if the air contains mixtures which adversely affect the hygroscopically sensitive substances of the hygrostats. Periodical regeneration or recalibration required for such hygrostats is no longer needed in the method according to the invention. All that is necessary is the occasional replacement of the wick surrounding the mercury bulb of the wet-bulb thermometer.

I claim:

An air-conditioning apparatus for maintaining a desired condition of an atmosphere within an enclosure comprising a duct both ends of which are connected to said enclosure, impeller means in said duct for withdrawing air from the enclosure and recirculating the air back into said enclosure, a plurality of conditioning devices in said duct, a control circuit for each conditioning device, a dry-bulb thermometer and a wet-bulb thermometer within the enclosure, electrically settable switch contacts on said thermometers, an electric automatic switching circuit connecting said settable contacts to said control circuits which switching circuit responds to each combined state of the switch contacts on the thermometers to select for each condition only the one of the control circuits for energization thereby operating the appropriate one of said conditioning devices which varies the state of the recirculated air tending to restore the desired conditions of the enclosure atmosphere corresponding to the setting of the thermometer switches wherein the conditioning devices comprise a cooling element, a heating element, a cold-water spraying device, and a steam-spraying device, the automatic switching circuit including a first relay means whose coil is connected in series with the switch of the dry-bulb thermometer, and a second relay means whose coil is connected in series with the switch of the wet-bulb thermometer, the contacts of said relay means being respectively connected to the control circuits of the conditioning devices whereby the appropriate device is selected for energization to cause operation of the desired conditioning device.

References Cited by the Examiner

UNITED STATES PATENTS 1,678,101 7/1928 Bower _____ 236—44 X
2,244,634 6/1941 Sisson _____ 165—20

ROBERT A. O'LEARY, *Primary Examiner.*

CHARLES SUKALO, FREDERICK L. MATTESON, JR., *Examiners.*

A. W. DAVIS, *Assistant Examiner.*